United States Patent
Park et al.

(10) Patent No.: US 9,698,413 B2
(45) Date of Patent: Jul. 4, 2017

(54) HIGH-CAPACITY CATHODE ACTIVE MATERIAL AND LITHIUM SECONDARY BATTERY INCLUDING THE SAME

(71) Applicant: LG CHEM, LTD., Seoul (KR)

(72) Inventors: Jung Hwan Park, Daejeon (KR); Hyun Seok Lee, Daejeon (KR); Youn Kyoung Lee, Seoul (KR); Ji Hee Ahn, Daejeon (KR); Hoe Jin Hah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 99 days.

(21) Appl. No.: 14/087,697

(22) Filed: Nov. 22, 2013

(65) Prior Publication Data

US 2014/0147727 A1    May 29, 2014

Related U.S. Application Data

(63) Continuation of application No. PCT/KR2012/007541, filed on Sep. 20, 2012.

(30) Foreign Application Priority Data

Sep. 20, 2011  (KR) .................... 10-2011-0094797

(51) Int. Cl.
   *H01M 4/13*   (2010.01)
   *H01M 4/52*   (2010.01)
   (Continued)

(52) U.S. Cl.
   CPC ............ *H01M 4/364* (2013.01); *C01G 45/02* (2013.01); *C01G 45/1257* (2013.01);
   (Continued)

(58) Field of Classification Search
   CPC ....... H01M 4/364; H01M 4/525; H01M 4/131
   See application file for complete search history.

(56) References Cited

U.S. PATENT DOCUMENTS 5,759,719 A     6/1998  Mao
2006/0251967 A1  11/2006  Goh
   (Continued)

FOREIGN PATENT DOCUMENTS

JP    1-289066 A    11/1989
JP    2-220357 A     9/1990
   (Continued)

OTHER PUBLICATIONS

Lithium-Containing Manganese Dioxide (Composite Dimensional Manganese Oxide: CDMO) as Positive Material for a Secondary Battery, Nohma et al. 1990, Journal of Power Sources, 32 (1990) p. 373-379.*

(Continued)

*Primary Examiner* — Ula C Ruddock
*Assistant Examiner* — Frank Chernow
(74) *Attorney, Agent, or Firm* — Birch, Stewart, Kolasch & Birch, LLP

(57) ABSTRACT

Provided are a cathode active material having high capacity and excellent lifetime characteristics as well as being inexpensive by mixing transition metal oxide having high irreversible capacity with composite dimensional manganese oxide (CDMO) of the following Chemical Formula 1, which has high capacity and good lifetime characteristics but is difficult to be charged and discharged by being used alone, and a lithium secondary battery including the cathode active material:

$x\text{MnO}_2 \cdot (1-x)\text{Li}_2\text{MnO}_3$ $(0<x<1)$.    [Chemical Formula 1]

12 Claims, 3 Drawing Sheets

(51) Int. Cl.

| | | |
|---|---|---|
| *H01M 4/36* | (2006.01) | |
| *H01M 4/505* | (2010.01) | |
| *H01M 4/525* | (2010.01) | |
| *H01M 4/485* | (2010.01) | |
| *C01G 45/02* | (2006.01) | |
| *C01G 45/12* | (2006.01) | |
| *C01G 53/00* | (2006.01) | |
| *H01M 4/131* | (2010.01) | |
| *H01M 10/052* | (2010.01) | |
| *H01M 4/62* | (2006.01) | |

(52) U.S. Cl.
CPC ............ *C01G 53/42* (2013.01); *H01M 4/131* (2013.01); *H01M 4/485* (2013.01); *H01M 4/505* (2013.01); *H01M 4/525* (2013.01); *C01P 2004/80* (2013.01); *C01P 2004/82* (2013.01); *C01P 2006/40* (2013.01); *H01M 4/625* (2013.01); *H01M 10/052* (2013.01); *H01M 2220/20* (2013.01); *Y02E 60/122* (2013.01)

(56) References Cited

U.S. PATENT DOCUMENTS

| | | |
|---|---|---|
| 2006/0257737 A1 | 11/2006 | Goh et al. |
| 2009/0155694 A1 | 6/2009 | Park |
| 2010/0021821 A1* | 1/2010 | Kim et al. ............... 429/231.95 |
| 2010/0203386 A1* | 8/2010 | Chang et al. ................. 429/220 |
| 2011/0017946 A1 | 1/2011 | Choi |
| 2011/0311869 A1 | 12/2011 | Oh et al. |
| 2011/0311872 A1 | 12/2011 | Oh et al. |

FOREIGN PATENT DOCUMENTS

| | | |
|---|---|---|
| JP | 5-028995 A | 2/1993 |
| JP | 2000-502831 A | 3/2000 |
| JP | 2001-160395 A | 6/2001 |
| JP | 2004-284845 A | 10/2004 |
| JP | 2008-532224 A | 8/2008 |
| JP | 2008-547156 A | 12/2008 |
| KR | 10-2009-0066021 A | 6/2009 |
| KR | 10-2011-0011497 A | 2/2011 |
| KR | 10-2011-0097718 A | 8/2011 |
| KR | 10-2011-0097719 A | 8/2011 |
| WO | WO 03/081697 A1 | 10/2003 |

OTHER PUBLICATIONS

Effect of carbon additive on electrochemical performance of LiCoO2 compositve cathodes, Hong et al. 2002, Journal of Power Sources 111 (2002) p. 90-96.*

International Search Report issued in PCT/KR2012/007541 mailed Jan. 31, 2013.

Extended European Search Report issued in European Patent Application No. 12833888.6 on Feb. 11, 2015.

Nohma et al., "Improvement of lithium-containing manganese dioxide (composite dimensional manganese oxide: CDMO) as positive material for lithium secondary batteries", Journal of Power Sources, vol. 39, No. 1 (1992) pp. 51-57.

Nohma et al., Manganese Oxides for a Lithium Secondary Battery—Composite Dimensional Manganese Oxide (CDMO), Journal of Power Sources, vol. 26, Nos. 3/4 (1989) pp. 389-396.

* cited by examiner

HIGH-CAPACITY CATHODE ACTIVE MATERIAL AND LITHIUM SECONDARY BATTERY INCLUDING THE SAME

This application is a continuation of International Application No. PCT/KR2012/007541 filed on Sep. 20, 2012, which claims the priority of Korean Patent Application No. 10-2011-0094797 filed on Sep. 20, 2011, in the Korean Intellectual Property Office, the disclosures of which are incorporated herein by reference.

TECHNICAL FIELD

The present invention relates to a cathode active material having improved capacity and lifetime characteristics and a lithium secondary battery including the same.

BACKGROUND ART

Recently, lithium secondary batteries have been used in various fields including portable electronic devices, such as mobile phones, personal digital assistants (PDAs), and laptop computers. In particular, in line with growing concerns about environmental issues, research into lithium secondary batteries having high energy density and discharge voltage as a power source of an electric vehicle, which may replace vehicles using fossil fuels such as gasoline vehicle and diesel vehicle, one of major causes of air pollution, has been actively conducted and some of the research are in a commercialization stage. Meanwhile, in order to use a lithium secondary battery as a power source of the electric vehicle, the lithium secondary battery must maintain stable power in a usable state of charge (SOC) range along with high power.

An electric vehicle is classified as a typical electric vehicle (EV), battery electric vehicle (BEV), hybrid electric vehicle (HEV), or plug-in hybrid electric vehicle (PHEV) according to a power source thereof.

The HEV among the above electric vehicles, as a vehicle obtaining a driving force from the combination of typical internal combustion engine (engine) and electric battery, has a mode, in which the driving force is mainly obtained through the engine while the battery assists insufficient power of the engine only in the case of requiring more power than that of a typical case, such as uphill driving, and the SOC is recovered again through charging the battery during the stop of the vehicle. That is, the engine is a primary power source in the HEV, and the battery is an auxiliary power source and is only used intermittently.

The PHEV, as a vehicle obtaining a driving force from the combination of engine and battery rechargeable by being connected to an external power supply, is broadly classified as a parallel-type PHEV and a series-type PHEV.

In the parallel-type PHEV, the engine and the battery are in an equivalent relationship to each other as a power source and the engine or the battery may alternatingly act as a primary power source according to the situation. That is, the parallel-type PHEV is operated in a mutually parallel mode, in which the battery makes up for insufficient power of the engine when the engine becomes a primary power source and the engine makes up for insufficient power of the battery when the battery becomes a primary power source.

However, the series-type PHEV is a vehicle basically driven only by a battery, in which an engine only acts to charge the battery. Therefore, since the series-type PHEV, differing from the HEV or the parallel-type PHEV, entirely depends on the battery rather than the engine in terms of driving of the vehicle, maintaining of stable output power according to battery characteristics in a usable SOC range becomes a very important factor for driving safety in comparison to other types of electric vehicles. The EV also requires a battery having a wide available SOC range.

Meanwhile, with respect to $LiCoO_2$, as a typical cathode material of a high-capacity lithium secondary battery, practical limits of an increase in energy density and power characteristics have been reached. In particular, when $LiCoO_2$ is used in high energy density applications, oxygen in a structure of $LiCoO_2$ is discharged along with structural degeneration in a high-temperature charged state due to its structural instability to generate an exothermic reaction with an electrolyte in a battery, and thus, it becomes a main cause of battery explosion. In order to improve the safety limitation of $LiCoO_2$, the use of lithium-containing manganese oxides, such as $LiMnO_2$ having a layered crystal structure and $LiMn_2O_4$ having a spinel crystal structure, and lithium-containing nickel oxide ($LiNiO_2$) have been considered, and a great deal of research into layer-structured lithium manganese oxides, in which Mn as an essential transition metal is added in an amount larger than those of other transition metals (excluding lithium) to layer-structured lithium manganese oxide as a high-capacity material, has also been conducted.

In particular, attention has been drawn recently to whether composite dimensional manganese oxide (CDMO) of the following chemical formula, in which $Li_2MnO_3$ and $(\gamma/\beta)$-$MnO_2$ are combined by substituting a part of $MnO_2$ with lithium (Li), can be used as a cathode active material.

$$xMnO_2 \cdot (1-x)Li_2MnO_3 (0 < x < 1)$$

As described above, the CDMO has a composite structure in which $Li_2MnO_3$ and $(\gamma/\beta)$-$MnO_2$ are combined by substituting a part of $MnO_2$ with Li. Since the crystal structure only including pure $(\gamma/\beta)$-$MnO_2$ may easily collapse as charge and discharge proceed, lifetime characteristics of the secondary battery may be poor when the CDMO is used as a cathode active material. However, since $Li_2MnO_3$ and $(\gamma/\beta)$-$MnO_2$ form a composite structure, the CDMO may have a relatively solid structure. Thus, research into using the CDMO as a cathode active material having high capacity and improved lifetime characteristics by increasing structural stability has been continuously conducted.

However, since charge and discharge may not be possible by using the CDMO alone, the use of the CDMO as an active material of the lithium secondary battery may not be possible. Therefore, the CDMO may not be used as a cathode active material yet.

DISCLOSURE OF THE INVENTION

Technical Problem

According to an aspect of the present invention, the present invention provides a cathode active material having high capacity and excellent lifetime characteristics as well as being inexpensive by mixing transition metal oxide capable of effectively providing lithium to the CDMO, which has high capacity and good lifetime characteristics but is difficult to be charged and discharged by being used alone.

The present invention also provides a lithium secondary battery including the cathode active material and a battery module including the two or more lithium secondary batteries.

Technical Solution

According to an aspect of the present invention,
there is provided a cathode active material including lithium manganese oxide (first transition metal oxide) expressed by Chemical Formula 1 below; and lithium-containing transition metal oxide (second transition metal oxide) having a difference between a charge capacity and a discharge capacity in a first cycle (irreversible capacity) of 200 mAh/g or more when charge and discharge are performed in a voltage range of 2.5 V to 4.3 V:

$$x\text{MnO}_2 \cdot (1-x)\text{Li}_2\text{MnO}_3 \text{ (where } 0 \leq x \leq 1\text{)}.$$ [Chemical Formula 1]

The second transition metal oxide may have an irreversible capacity of 250 mAh/g or more.

The second transition metal oxide may be expressed by Chemical Formula 2 below:

$$\text{Li}_2\text{Ni}_x\text{Cu}_{1-x}\text{O}_2 \text{ (where } 0 \leq x \leq 1\text{)}.$$ [Chemical Formula 2]

Furthermore, the second transition metal oxide may be included in an amount of 5 parts by weight to 50 parts by weight based on 100 parts by weight of the cathode active material.

The second transition metal oxide may be included in an amount of 20 parts by weight to 40 parts by weight based on 100 parts by weight of the cathode active material.

The cathode active material may further include a conductive agent.

The conductive agent may be formed of graphite and conductive carbon, and the conductive agent may be included in an amount of 0.5 parts by weight to 15 parts by weight based on 100 parts by weight of the mixed cathode active material.

In this case, the conductive carbon may be a mixture of one or more materials selected from the group consisting of carbon black including carbon black, acetylene black, Ketjen black, channel black, furnace black, lamp black, or thermal black, or a material having a crystal structure of graphene or graphite.

Furthermore, the cathode active material may further include one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein.

The other elements may be one or more selected from the group consisting of aluminum (Al), magnesium (Mg), nickel (Ni), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), and bismuth (Bi).

In this case, the lithium-containing metal oxide may be included in an amount of 50 parts by weight or less based on 100 parts by weight of the mixed cathode active material.

According to another aspect of the present invention, there is provided a cathode including the cathode active material.

According to another aspect of the present invention, there is provided a lithium secondary battery including the cathode as well as a battery module including the two or more lithium secondary batteries.

The battery module may be used as a power source of any one of a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

Advantageous Effects

Since the present invention provides a cathode active material which is relatively inexpensive and stable and has high capacity, excellent effects may not only be provided by being used in small devices but a secondary battery having a wide available state of charge (SOC) range may also be provided. Therefore, excellent effects may also be provided by being used in medium and large sized devices, such as an electric vehicle.

MODE FOR CARRYING OUT THE INVENTION

Figure 1:
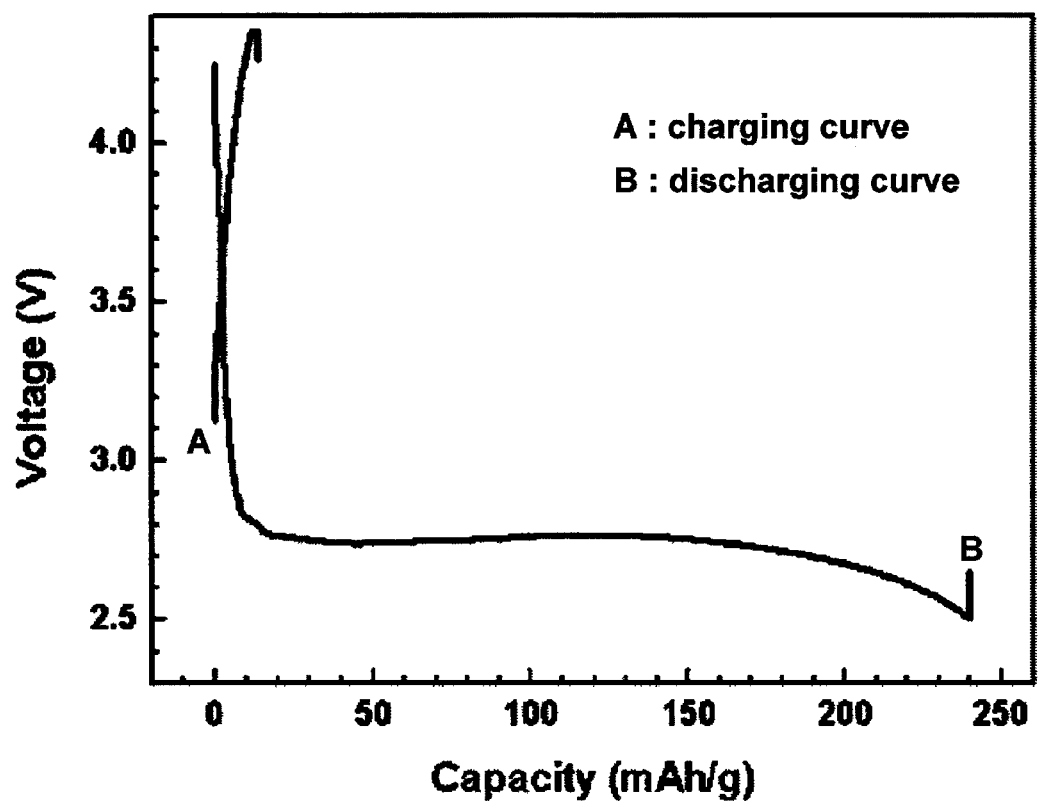
FIGS. 1 and 2 are graphs illustrating capacities according to charge and discharge of lithium secondary batteries according to Comparative Examples of the present invention.

According to an aspect of the present invention, there is provided a cathode active material including lithium manganese oxide (first transition metal oxide) expressed by Chemical Formula 1 below; and lithium-containing transition metal oxide (second transition metal oxide) having a difference between a charge capacity and a discharge capacity in a first cycle (irreversible capacity) of 200 mAh/g or more in a case where charge and discharge are performed in a voltage range of 2.5 V to 4.3 V:

$$x\text{MnO}_2 \cdot (1-x)\text{Li}_2\text{MnO}_3 \text{ (where } 0 < x < 1\text{)}.$$ [Chemical Formula 1]

The first transition metal oxide expressed by Chemical Formula 1 has a composite structure, in which $\text{Li}_2\text{MnO}_3$ and $(\gamma/\beta)\text{-MnO}_2$ are combined by substituting a part of $\text{MnO}_2$ with lithium (Li).

Since the crystal structure only including pure $(\gamma/\beta)$-$\text{MnO}_2$ may easily collapse as charge and discharge proceed, lifetime characteristics of the secondary battery may be poor when the first transition metal oxide is used as a cathode active material. However, since $\text{Li}_2\text{MnO}_3$ and $(\gamma/\beta)$-$\text{MnO}_2$ form a composite structure, the first transition metal oxide may have a relatively solid structure, and thus, the first transition metal oxide may increase structural stability.

Also, the first transition metal oxide exhibits discharge characteristics higher than those of $(\gamma/\beta)$-$\text{MnO}_2$ in a cycle test at a depth of 0.14 e/Mn and cycle performance at a depth of 0.26 e/Mn exhibits discharge characteristics higher than those of $\text{LiMn}_2\text{O}_4$ having a spinel structure. As a result of measurements using a lithium counter electrode, an operating voltage range of about 2.5 V to 3.3 V and an initial theoretical capacity of 200 mAh/g may be obtained during charging and discharging, and thus, the first transition metal oxide has a possibility of being used as a cathode active material having high capacity and excellent lifetime characteristics.

However, since charge and discharge may not be performed by using the first transition metal oxide alone, there may be difficulties in using the first transition metal oxide as a cathode active material. The reason that the charge and discharge may not be possible using the first transition metal oxide alone is because lithium of the first transition metal oxide itself may not be deintercalated in the current secondary battery system, in which charge and discharge are performed in a voltage range of 2.5 V to 4.3 V. That is, since the lithium included in $\text{Li}_2\text{MnO}_3$ in the structure of the first transition metal oxide of Chemical Formula 1 may not be deintercalated at the above operating voltage level of a typical battery, there may be no lithium that may be involved in the charge and discharge. Thus, the use of the first transition metal oxide alone as a cathode active material may not be possible.

Therefore, in the present invention, the lithium-containing transition metal oxide (second transition metal oxide) having the difference between the charge capacity and the discharge capacity in the first cycle (irreversible capacity) of 200 mAh/g or more in the case where charge and discharge are performed in a voltage range of 2.5 V to 4.3 V is mixed as an additive that may provide a lithium source to the first transition metal oxide.

The second transition metal oxide has an irreversible capacity of 200 mAh/g or more, in which lithium having the above irreversible capacity is intercalated into the first transition metal oxide during discharging to act as a lithium source. The lithium intercalated into the first transition metal oxide during the discharging may participate in charging and discharging processes of the battery while being intercalated into and deintercalated from the first transition metal oxide during the continuous charging and discharging processes, and thus, a cathode active material having high capacity and long lifetime characteristics may be provided.

Furthermore, the second transition metal oxide acting as a lithium source may have an irreversible capacity of 250 mAh/g or more. The reason for this is that it may be desirable to allow theoretical capacity to be entirely exhibited by providing a sufficient amount of lithium to the first transition metal oxide. However, in the case that a material having excessively high irreversible capacity above the theoretical capacity of the first transition metal oxide is added, the lifetime characteristics of the battery may degrade due to the excessive precipitation of lithium and the formation of dendrites.

The second transition metal oxide may be expressed by Chemical Formula 2 below.

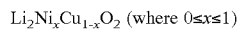

$Li_2Ni_xCu_{1-x}O_2$ (where $0 \le x \le 1$)     [Chemical Formula 2]

Since the lithium transition metal oxide expressed by Chemical Formula 2 may have an irreversible capacity of about 250 mAh/g or more when charge and discharge are performed in a voltage range of 2.5 V to 4.3 V, the lithium transition metal oxide may provide the sufficient amount of lithium to the first transition metal oxide.

However, since the irreversible capacity may vary according to a composition in which the second transition metal oxide is included in the cathode active material, the capacity of the second transition metal oxide may be adjusted according to the capacity of the first transition metal oxide included in the cathode active material.

In this case, the second transition metal oxide may be included in an amount of 5 parts by weight to 50 parts by weight based on 100 parts by weight of the cathode active material, and for example, may be included in an amount of 20 parts by weight to 40 parts by weight.

Since the amount of the second transition metal oxide is included within the above range, the theoretical capacity of the first transition metal oxide may be entirely exhibited and simultaneously, the irreversible capacity may be decreased to allow all lithium ions to participate in the charging and discharging processes. Thus, the formation of the dendrites may be minimized.

Since the cathode active material, in which the first transition metal oxide and the second transition metal oxide are mixed, may exhibit high capacity in a voltage range of 2.5 V to 4.3 V as well as excellent lifetime characteristics and may exhibit a uniform profile over an entire state of charge (SOC) range, a cathode active material having significantly improved output characteristics may also be provided.

A method of preparing the cathode active material, in which the first transition metal oxide and the second transition metal oxide are mixed, according to the present invention is not significantly limited, various methods known in the art may be selected.

Also, in the cathode active material according to the present invention, particle sizes or shapes of the first transition metal oxide and the second transition metal oxide are made to be as uniform as possible, and thus, a phenomenon may be prevented, in which a conductive agent coating the mixed cathode active material is concentrated on only any one side having a larger (specific) surface area and as a result, conductivity of the other cathode active material having a relatively less amount of the conductive agent distributed therein is significantly decreased. As a result, conductivity of the cathode active material may be significantly improved.

In order to decrease the difference between the particle sizes or specific surface areas of two or more cathode active materials to be mixed, a method of forming a cathode active material having a relatively smaller particle size as larger secondary particles, a method of forming a cathode active material having a relatively larger particle size as smaller particles, or a method of simultaneously using both methods may be used.

The cathode active material according to the present invention may include two or more conductive agents having different particle sizes or shapes.

A method of including the conductive agent is not significantly limited and a typical method known in the art, such as coating of the cathode active material, may be used. As described above, this is for preventing the phenomenon, in which the conductive agent is concentrated on any one side due to the particle size difference between the cathode active materials to be mixed. In a preferred embodiment of the present invention, graphite and conductive carbon may be simultaneously used as the conductive agent.

The mixed cathode material may be simultaneously coated with graphite and conductive carbon having different particle sizes and shapes as the conductive agent, and thus a decrease in the conductivity or the low power of the entire cathode active material due to the difference between the particle sizes or the surface areas of the first transition metal oxide and the second transition metal oxide may be more effectively improved. At the same time, a high-capacity cathode material having a wide available SOC range may be provided.

In addition to the first transition metal oxide and the second transition metal oxide, the cathode active material according to the present invention may further include one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein. The other elements may be one or more selected from the group consisting of aluminum (Al), magnesium (Mg), nickel (Ni), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), and bismuth (Bi).

In this case, the lithium-containing metal oxide may be included in an amount of 50 parts by weight or less based on 100 parts by weight of the cathode active material.

The graphite and conductive carbon are not particularly limited so long as they have excellent electrical conductivity and do not cause a side reaction in the inner environment of the lithium secondary battery or chemical changes in the present battery as well as having electrical conductivity.

Specifically, nature graphite or artificial graphite may be used without limitation as the graphite. A carbon-based material having high electrical conductivity may be particularly used as the conductive carbon, and specifically, a mixture of one or more materials selected from the group consisting of carbon black, such as acetylene black, Ketjen black, channel black, furnace black, lamp black, or thermal black, or a material having a crystal structure of graphene or graphite may used as the conductive carbon. In some cases, a conductive polymer having high electrical conductivity may be used.

Herein, the conductive agent formed of the graphite and the conductive carbon may be included in an amount of 0.5 to 15 parts by weight based on 100 parts by weight of the mixed cathode material. When a content of the conductive agent is too low, as less than 0.5 parts by weight, the above-described effects may not be expected, and when the content of the conductive agent is too high, as greater than 15 parts by weight, high capacity or high energy density may not be obtained due to the relatively less amount of the cathode active material.

In this case, a content of the conductive carbon may be included in an amount of 1 to 13 parts by weight based on 100 parts by weight of the cathode material and for example, may be included in an amount of 3 to 10 parts by weight.

The present invention provides a cathode material including the cathode active material, a lithium secondary battery cathode having a current collector coated with the cathode material, and a lithium secondary battery including the cathode.

In general, a lithium secondary battery is composed of a cathode including a cathode material and a current collector, an anode including an anode material and a current collector, and a separator that may block electronic conduction between the cathode and the anode and may conduct lithium ions. An electrolyte solution for the conduction of lithium ions is included in voids of electrode and separator materials.

The cathode and the anode are generally prepared by coating the current collector with a mixture of electrode active material, conductive agent, and binder, and then drying the coated collector. A filler may be further added to the mixture if necessary.

The lithium secondary battery of the present invention may be prepared according to a typical method known in the art. Specifically, the lithium secondary battery may be prepared by inserting a porous separator between the cathode and the anode and introducing a non-aqueous electrolyte solution.

Also, the present invention further provides a battery module or battery pack including the two or more lithium secondary batteries. In this case, the battery module or battery pack may not only be used as a power source of small devices, such as mobile phones and notebooks, but may also be used as a power source of any one of medium and large sized devices, such as a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

Hereinafter, the present invention will be described in detail, according to specific examples.

Example

Preparation of Cathode

A slurry was prepared by adding 90 wt % of a mixture composed of $0.9MnO_2$-$0.1Li_2MnO_3$ (60 wt %) and $Li_2NiO_2$ (40 wt %) as a cathode active material, 6 wt % of Denka black as a conductive agent, and 4 wt % of polyvinylidene fluoride (PVDF) as a binder to N-methyl-pyrrolidone (NMP). An aluminum (Al) foil as a cathode current collector was coated with the slurry, and the coated Al foil was then rolled and dried to prepare a cathode for a lithium secondary battery.

Preparation of Lithium Secondary Battery

A porous polyethylene separator was disposed between the cathode thus prepared and a graphite-based anode, and a lithium electrolyte solution was introduced to prepare a polymer-type lithium secondary battery.

Capacity was measured while the polymer-type lithium secondary battery was charged and discharged between 2.5 V and 4.3 V (C–rate=1C).

Comparative Example 1

Capacity according to charge and discharge was measured in the same manner as Example except that a half-cell was prepared by using only $0.9MnO_2.0.1Li_2MnO_3$, as a cathode active material, and lithium as an anode.

Comparative Example 2

Capacity according to charge and discharge was measured in the same manner as Example except that only $Li_2NiO_2$ was used as a cathode active material.

Experimental Example

Figure 2:
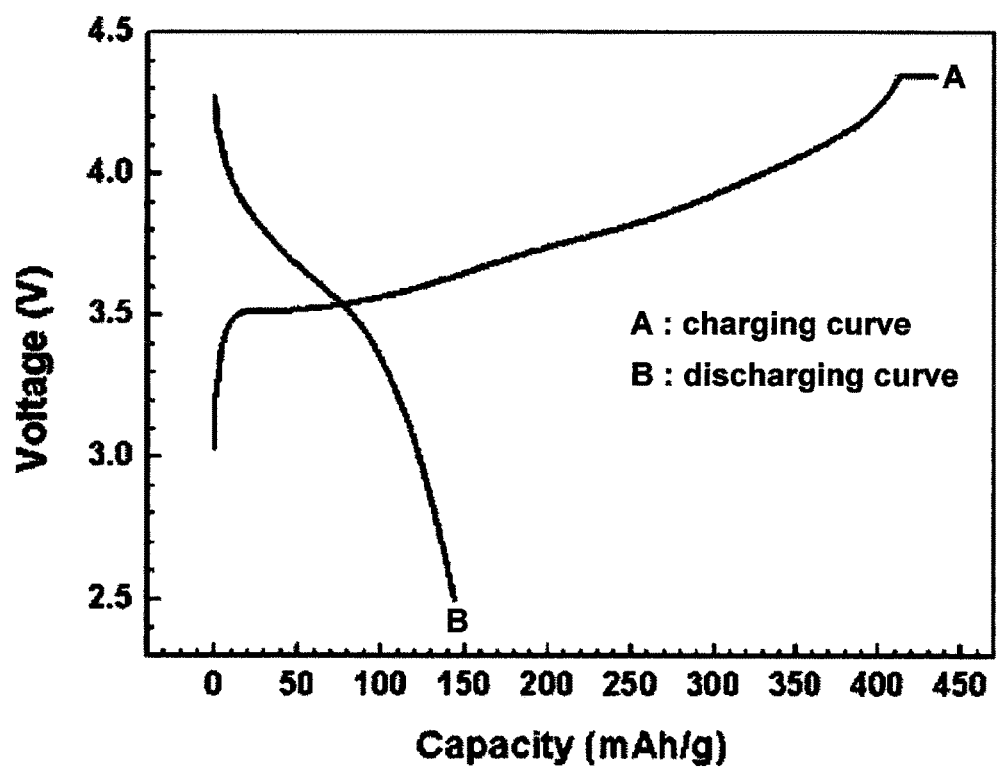
Figure 3:
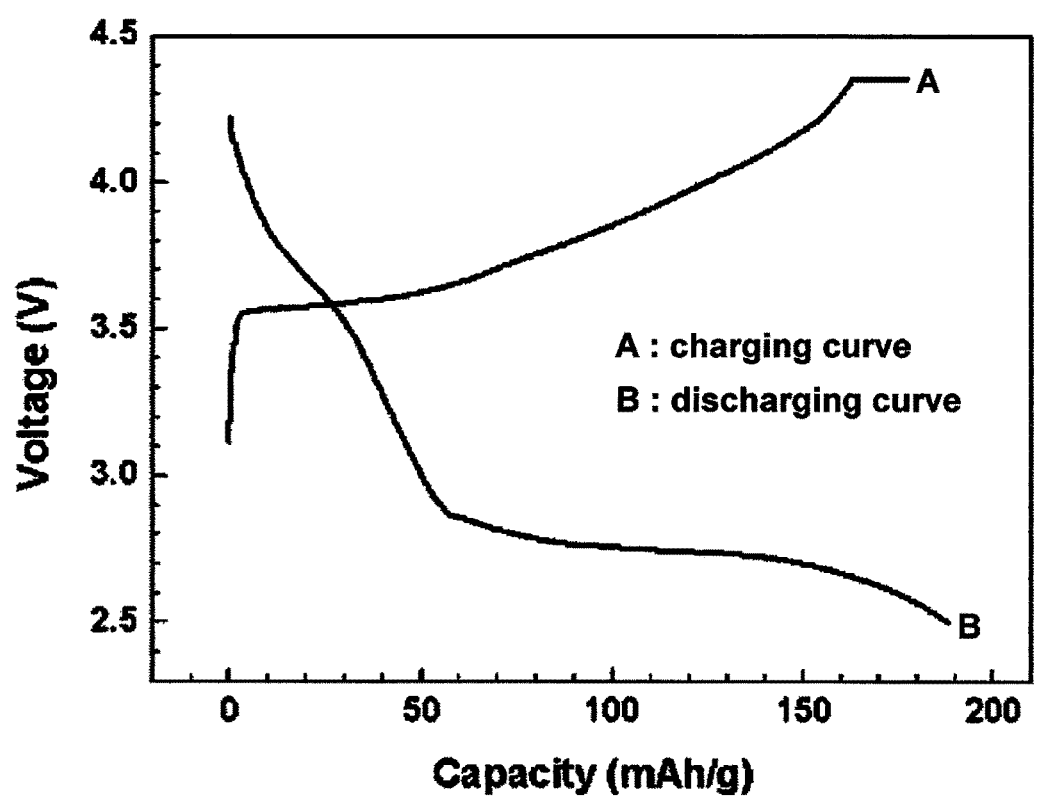
FIG. 3 is a graph illustrating capacity according to charge and discharge of a lithium secondary battery according to Example of the present invention.

The capacities of the batteries were evaluated while the lithium secondary batteries according to Example and Comparative Examples 1 and 2 were charged and discharged in a voltage range of 2.5 V to 4.3 V, and the results thereof are presented in FIGS. 1 to 3.

FIG. 1 is a charge and discharge graph of the secondary battery according to Comparative Example 1.

As confirmed in a charging curve illustrated in FIG. 1, in the case that the electrode was formed by using the CDMO alone, there was no lithium that may participate in charge and discharge. Also, as confirmed in a discharging curve of the CDMO measured by using the lithium counter electrode, the CDMO had a relatively high capacity of about 250 mAh/g.

FIG. 2 is a charge and discharge graph of the secondary battery according to Comparative Example 2, in which it may be confirmed that the lithium secondary battery using $Li_2NiO_2$ alone had a large irreversible capacity, i.e., a difference between a charge capacity and a discharge capacity.

FIG. 3 is a charge and discharge graph of the secondary battery according to Example of the present invention, in which, as illustrated in FIG. 3, since the secondary battery according to the present invention, including a cathode active material having the first transition metal oxide and the second transition metal oxide mixed therein, exhibited high capacity, excellent lifetime characteristics, and a relatively uniform profile over an entire SOC range, significantly improved output characteristics may also be provided.

Data illustrated in FIGS. 1 to 3 are merely exemplary, and since detailed numerical values may vary according to the specification of each cell, it may be considered that trends in the graphs may be more important than the detailed numerical values.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A cathode active material comprising:
lithium manganese oxide (first transition metal oxide) expressed by Chemical Formula 3 below; and
lithium-containing transition metal oxide (second transition metal oxide) having a difference between a charge capacity and a discharge capacity in a first cycle (irreversible capacity) of 200 mAh/g or more when charge and discharge are performed in a voltage range of 4.3 V~2.5 V:

$$0.9MnO_2 \cdot 0.1Li_2MnO_3, \qquad \text{[Chemical Formula 3]}$$

wherein the second transition metal oxide is expressed by Chemical Formula 2 below and is included in an amount of 20 parts by weight to 40 parts by weight based on 100 parts by weight of the cathode active material:

$$Li_2Ni_xCu_{1-x}O_2 \text{ (where } 0 \leq x \leq 1\text{).} \qquad \text{[Chemical Formula 2]}$$

2. The cathode active material of claim 1, wherein the second transition metal oxide has an irreversible capacity of 250 mAh/g or more.

3. The cathode active material of claim 1, wherein the cathode active material further comprises a conductive agent.

4. The cathode active material of claim 3, wherein the conductive agent is formed of graphite and conductive carbon.

5. The cathode active material of claim 3, wherein the conductive agent is included in an amount of 0.5 parts by weight to 15 parts by weight based on 100 parts by weight of the cathode active material.

6. The cathode active material of claim 4, wherein the conductive carbon is a mixture of one or more materials selected from the group consisting of carbon black, acetylene black, Ketjen black, channel black, furnace black, lamp black, thermal black, and a material having a crystal structure of graphene or graphite.

7. The cathode active material of claim 1, wherein the cathode active material further comprises one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having one or more elements selected from the group consisting of aluminum (Al), magnesium (Mg), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), and bismuth (Bi), substituted or doped therein.

8. The cathode active material of claim 7, wherein the lithium-containing metal oxide is included in an amount of 50 parts by weight or less based on 100 parts by weight of the cathode active material.

9. A cathode comprising the cathode active material of claim 1.

10. A lithium secondary battery comprising the cathode of claim 9.

11. A battery module comprising two or more lithium secondary batteries of claim 10.

12. The battery module of claim 11, wherein the battery module is a power source of any one of a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

* * * * *